United States Patent [19]
Dulude et al.

[11] 3,859,705
[45] Jan. 14, 1975

[54] MACHINES FOR THE MANUFACTURE OF SPRING ASSEMBLIES

[75] Inventors: Donald O. Dulude; Paul H. Winbigler, both of Coldwater, Mich.

[73] Assignee: Kuhlman Corporation, Troy, Mich.

[22] Filed: Nov. 23, 1973

[21] Appl. No.: 418,685

Related U.S. Application Data

[62] Division of Ser. No. 331,750, Feb. 13, 1973, , which is a division of Ser. No. 203,534, Dec. 1, 1971, Pat. No. 3,782,708.

[52] U.S. Cl. ............... 29/200 B, 29/208 D, 29/227, 267/91, 267/179
[51] Int. Cl. ............................................. B23p 19/00
[58] Field of Search .......... 29/200 B, 211 D, 200 R, 29/208 D, 208 F, 173, 227, 235, 512; 140/89; 267/91, 179; 192/89

[56] References Cited
UNITED STATES PATENTS

| | | | |
|---|---|---|---|
| 1,466,363 | 8/1923 | Hamilton | 29/173 X |
| 2,568,775 | 9/1951 | Stull | 83/202 X |
| 2,716,308 | 8/1955 | Hodges, Jr. | 29/200 B |
| 3,122,829 | 3/1964 | Schaad et al. | 29/200 B X |

*Primary Examiner*—C. W. Lanham
*Assistant Examiner*—Victor A. DiPalma
*Attorney, Agent, or Firm*—Everett R. Casey

[57] ABSTRACT

A machine for assembling one or more springs upright on a base and securing the end turns of the spring thereto. The disclosed apparatus includes a spring coiler each completed spring from which is moved to the base without intertangling lateral engagement with other springs, with a tool both positioning the spring in the base and deforming the base to secure the spring in place.

32 Claims, 12 Drawing Figures

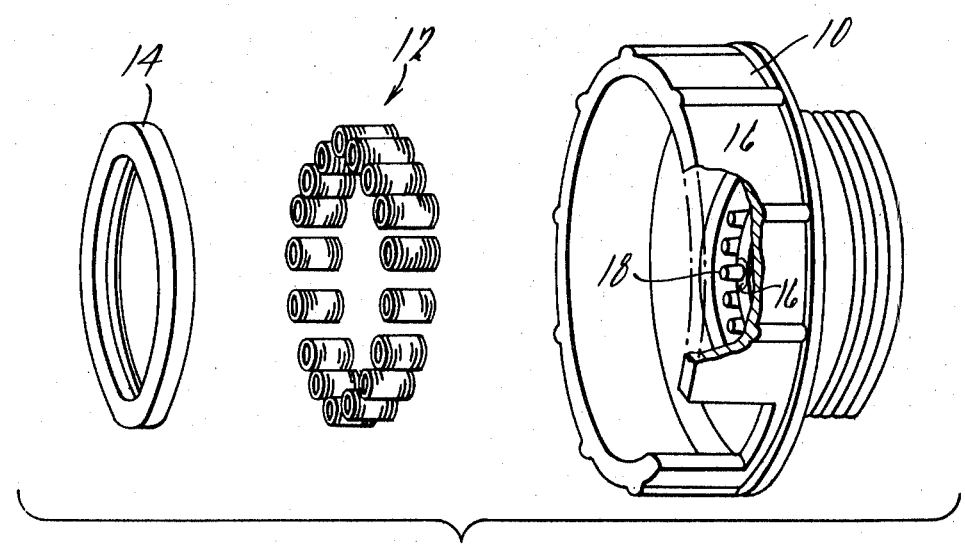
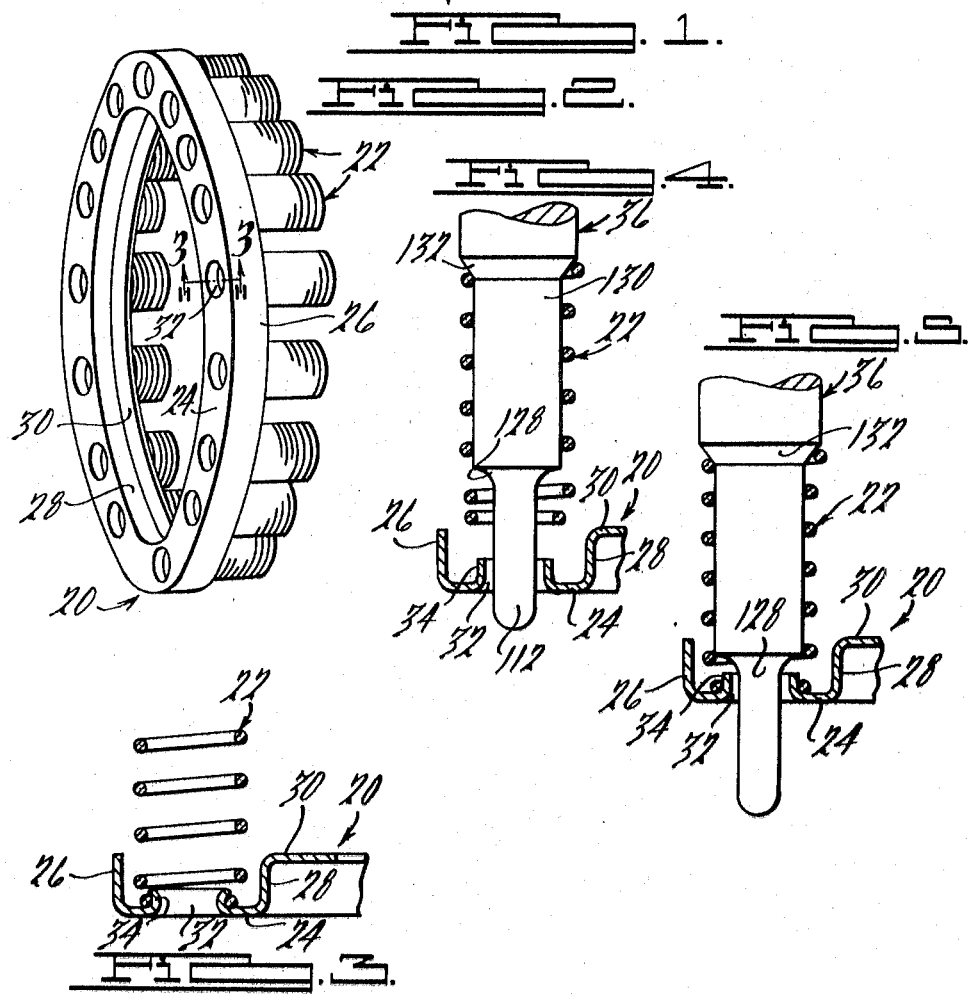

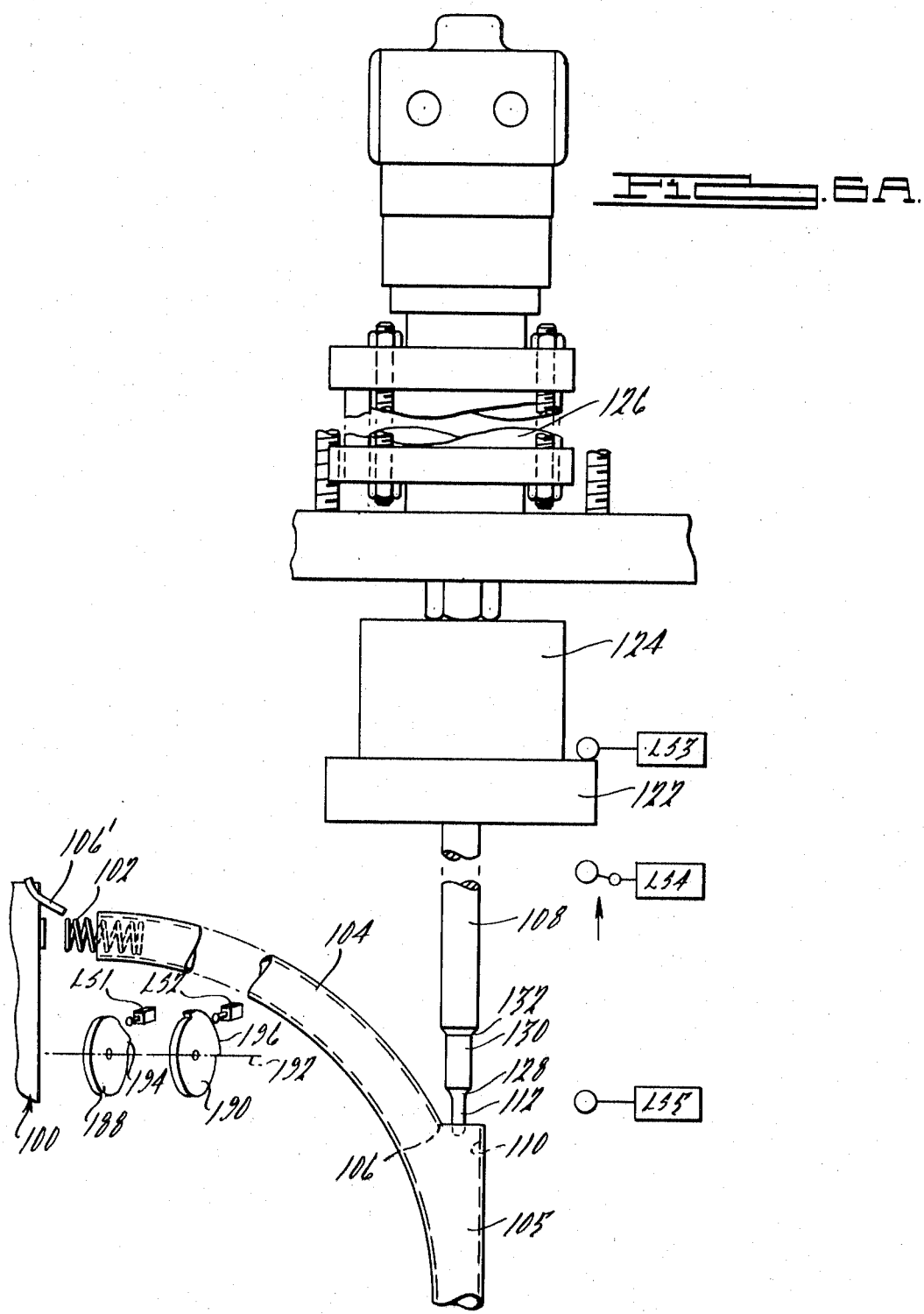

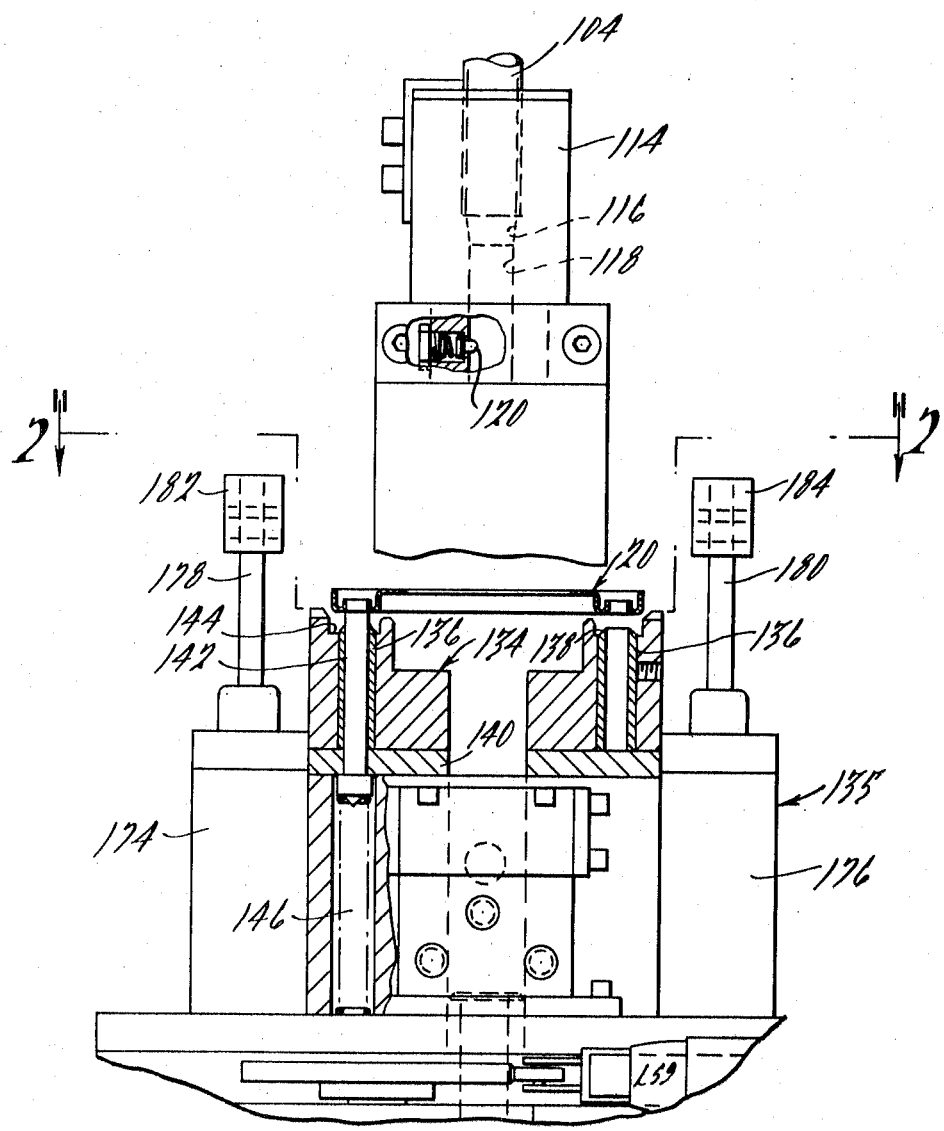

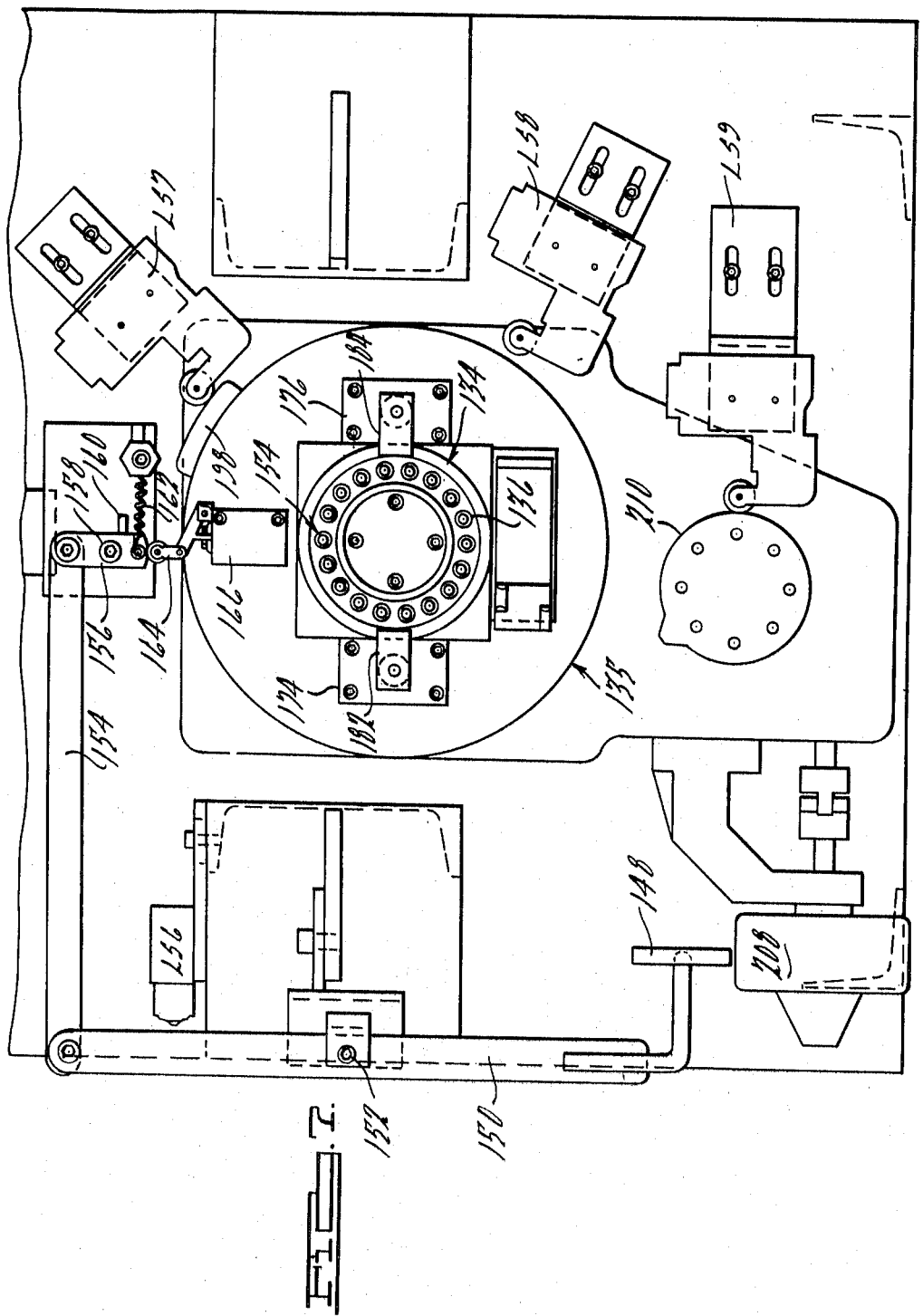

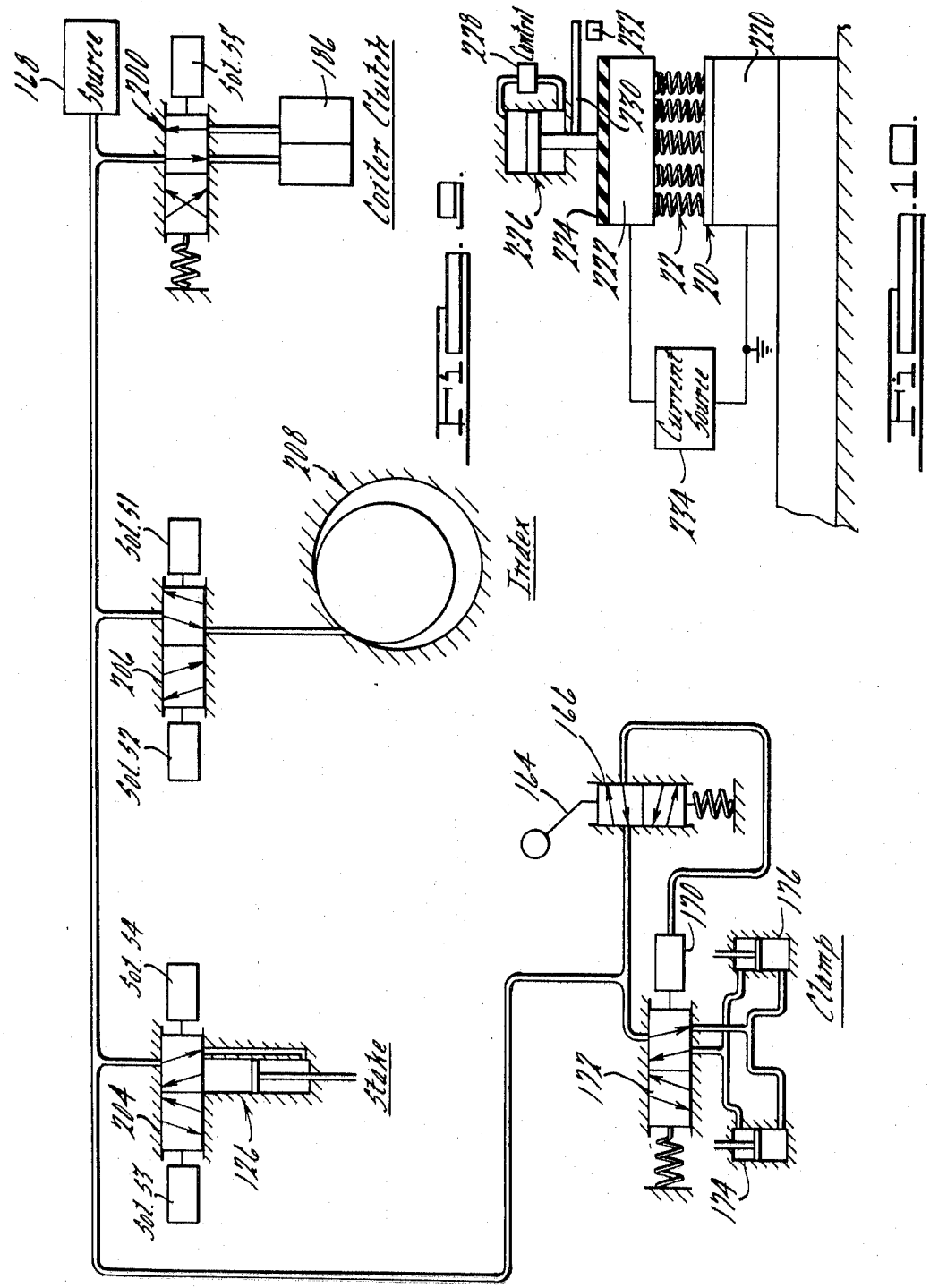

3,859,705

MACHINES FOR THE MANUFACTURE OF SPRING ASSEMBLIES

This is a division of application Ser. No. 331,750 filed Feb. 13, 1973, which is in turn a division of application Ser. No. 203,534 filed Dec. 1, 1971, now U.S. Pat. No. 3,782,708.

BACKGROUND OF THE INVENTION

Automatic transmissions for vehicles often include a die-cast bell resiliently spaced from an annular plate by a series of circumferentially spaced, parallel, stress-relieved, compression springs, such subassemblies being used as elements of apparatus for performing various clutching functions, and the like, in the transmission.

In one common practice, the bell is a generally cup-shaped die casting provided with a plurality of circumferentially or annularly spaced cast bosses, projecting from a flat base surface, to serve as spring centering guides. With the bell positioned on a work table so that the base surface is horizontal and the spring guides project upwardly, an operator positions each of a corresponding plurality of stress-relieved compression springs on individual ones of the spring guides, with the spring axes projecting generally vertically. In preparation for that step, the springs are provided with a ground end face so that the spring will tend to stand upright on the base surface both at the instant of assembly and throughout the travel of the partially assembled unit down a conveyor. To avoid the requirement that each spring be correctly oriented end-for-end during such assembly, the spring manufacturer customarily grinds both ends of each spring flat before boxing and shipping the springs for assembly at the transmission plant. In further preparation for the assembly step, the springs are customarily unboxed at the transmission plant and disentangled either manually or with the use of auxiliary equipment.

In a later assembly step, the annular plate is associated with the bell, normally as an element of a larger assembly, to entrap the springs therebetween.

Apart from the cost of the direct labor in that mode of assembly, there is some percentage of assemblies in which one or more springs are cocked into interlocking relationship with an adjacent spring, or in which one or more springs are inadvertently omitted during initial assembly, or jiggle off during conveyor transit before final assembly, impairing the suitability of the assembly for use in a transmission.

In accordance with one aspect of the present invention, the annular plate, now serving a seat function, is desirably a stamping including a plurality of annularly spaced projecting nubs (or nib, protuberance, hub, or other nomenclature). Each spring is accurately positioned relative to each nub, including both centering and straightening. The spring is then secured to the plate, desirably by staking the periphery of the nub over the bottom turn of the spring, with the bottom turn preferably being closed so that the lower turn lies essentially in a plane, and with, desirably, the lower turn also being slightly smaller in diameter than the other turns to avoid interference between the staked material and the succeeding turn of the spring.

In the preferred method of assembly, the seat is placed upon an index table of an assembly machine and each spring is transferred by a tube directly from the spring coiler, immediately upon its manufacture, to the assembly machine, with each such spring then being staked to the seat, and with the seat being rotated by the index table in step with the generation of the springs by the spring coiler. During the staking, each individual spring is accurately precompressed, centered, and straightened.

The springs in each assembly are then stress-relieved at appropriate stress-relieving temperatures by trapping the assembly between a pair of jaws which precompress the springs uniformly to a desired height which is lower than their initial height, and then passing electric current through the plate, and through the individual springs in parallel, to resistance heat the springs to their stress-relief temperature, while yet not heating the lower-resistance seat to any temperature which will adversely affect the seat or its surface characteristics.

DRAWINGS

FIG. 1 is an exploded perspective view of a representative prior art configuration including a bell, an annular plate and a plurality of compression springs trappable therebetween;

FIG. 2 is a perspective view of an assembly incorporating certain features of the present invention;

FIG. 3 is the fragmentary sectional view taken substantially along the line 3—3 of FIG. 2;

FIG. 4 is a fragmentary view of a portion of a seat, a spring, and a representative centering, aligning and staking tool, incorporating certain features of the present invention;

FIG. 5 is a view corresponding to FIG. 4, but showing the parts in a different interrelationship;

Figure 8:
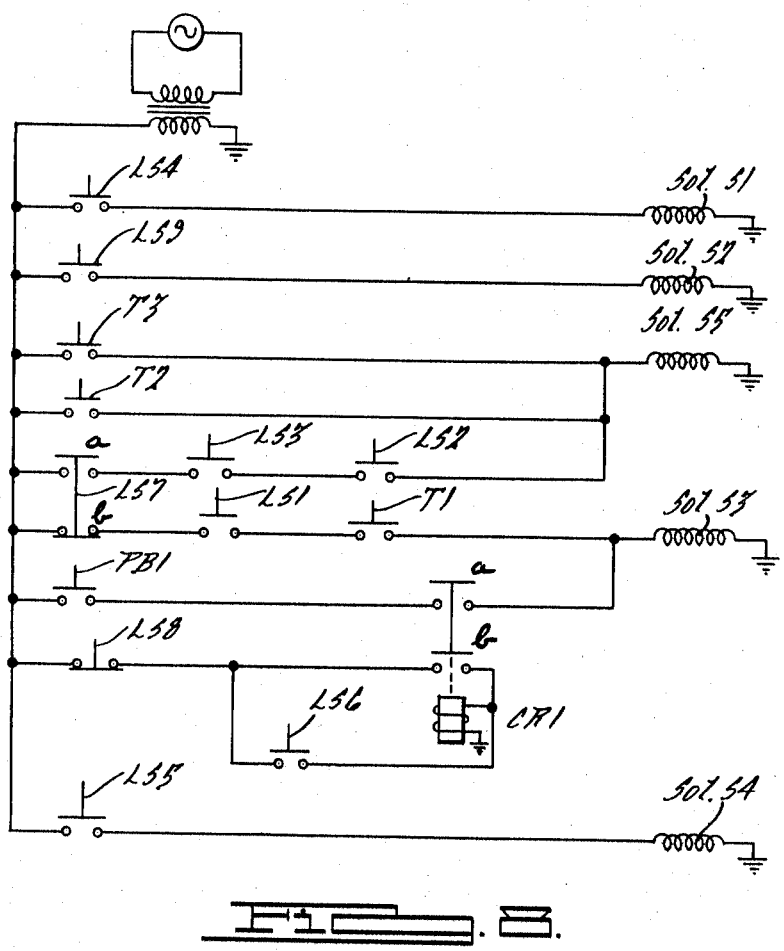
Figure 11:
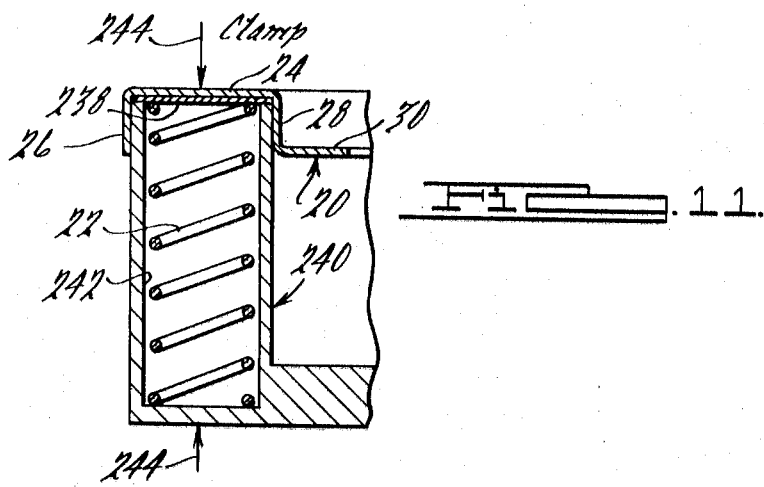

FIGS. 6A and 6B (the former being placed above the latter) are a fragmentary elevational view of an assembly machine and coiler combination incorporating certain principles of the present invention;

FIG. 7 is a horizontal sectional view taken substantially along the line 7—7 of FIG. 6B;

FIG. 8 is a schematic representation of an electrical circuit suitable for use in conjunction with the machine of FIGS. 6A, 6B and 7;

FIG. 9 is a schematic representation of a pneumatic circuit suitable for use in conjunction with the machine in FIGS. 6A, 6B and 7;

FIG. 10 is a representation of a stress-relief apparatus incorporating certain principles of the present invention; and FIG. 11 is a diagrammatic representation of another apparatus for forming a spring and spring seat assembly.

DESCRIPTION

FIG. 1 of the drawing illustrates a generally cup-shaped die cast bell member 10, a plurality of compression springs 12 and an annular plate 14 constituting representative counterparts of elements customarily used (usually as parts of a clutch assembly) in automotive automatic transmissions. Member 10 has an internal flat base surface 16 from which projects a plurality of annularly spaced cast bosses 18 which serve as spring guides for the individual springs 12. The springs 12 are assembled over the bosses 18 and into engagement with the base 16 and those springs are then trapped in that relationship by assembling the plate 14 thereto in any suitable fashion, usually including the insertion of an axial shaft having the securing means thereon.

The subassembly of FIG. 2 comprises a stamped seat 20 and a plurality of springs, such as spring 22, which are essentially the same as springs 12 in FIG. 1, except that the expense of grinding can be avoided, and except as noted hereinafter. The springs 22 are or may be secured to stamping 20 by the spring manufacturer and that subassembly is shipped to the transmission assembly plant, to avoid the above-described direct labor cost at the transmission assembly factory. By virtue of the automatic assembly of the unit of FIG. 2 in the manner to be described, the omission of any springs is avoided, and all springs are straight, non-interlocked, and uniformly spaced. In addition, if the preferred assembly and treatment procedure is followed, the springs are of more uniform height than would normally be achieved with the assembly of FIG. 1.

The seat stamping 20 comprises an annular base 34, an outer upstanding lip or rim 26, and an inner lip or rim 28 terminating in an annular central portion 30.

During the stamping operation, a plurality of uniformly annular spaced holes, such as hole 32, are formed in base 24, with the material at those holes being punched to form or extrude an upstanding wall or nub 34 (FIG. 4) projecting perpendicularly from the face of base 24 and being generally cylindrical, or but slightly conical. The outer diameter of the upstanding nub is desirably no larger than the inner diameter of the lower turn of the spring 22 which is associated with that nub during the manufacturing process.

The view of FIG. 4 illustrates a condition before spring 22 is assembled to seat 20. Spring 22 is shown riding upon a fragmentarily represented staking or swaging tool 36 which may be a hand tool (such as one which can be struck with a hammer) or which, as is illustrated hereinafter, may be part of an assembly machine. While representatively proposed to be moved in translation to perform its operations, the tool can also or alternatively be rotated to perform a spinning rather than a staking operation, if desired. It also may have peripheral irregularities to perform non-uniform staking, if desired.

Tool 36 comprises a centering tip 112, which can be inserted into the holes 32 formed in the stamping 20, a radiused staking section 128, a generally cylindrical portion 130, and a tapered or conical portion 132. The generally cylindrical portion 130 is desirably but slightly smaller than the inner diameter of the major length of the spring 22 so that if the tool 36 is accurately centered with respect to the holes 32 and is accurately aligned with and moved along the longitudinal axis of hole 32 (perpendicularly to the base 24), spring 22 will be both centered with respect to that hole and straight in the sense of projecting perpendicularly from the surface 24. In the illustrated arrangement, the conical section 132 tapers to a diameter larger than the internal diameter of the spring so that if a spring is placed thereon, the upper turn will tend to be wedged against the portion 132 to secure the spring to the tool temporarily during translation of the tool. Obviously, this is not essential, particularly if the tool 36 is a hand tool in which the spring could as well be initially positioned upon the base 24 and the tool inserted thereafter, in which case surface 132 could either be tapered or horizontal. The lead or tip portion 112 should be smaller than aperture 132, and the radius or forming portion 128 should form a transition to a diameter greater than that of the hole 32, and desirably greater than the inner diameter of the lower spring turn.

Assuming that the spring 22 is positioned upon the tool 36 in the manner illustrated in FIG. 4, as the tool 36 is moved downwardly towards the seat 20, the lower turn of the spring 22 circumscribes the nub 34 and the bottom surface of that spring seats on the flat base portion 24 of the seat 20. In the preferred arrangement, the lower turn of the spring is flat and closed (although it need not be ground) so as to engage the upper surface of the base portion 24 for essentially a full turn, when the spring is straight. This condition is illustrated in FIG. 5 of the drawings in which tool 36 has been further advanced to the point at which the radius portion 128 is about to engage the upper inner edge of the nub 34. Desirably, the distance between the tapered (or flat) reaction surface 132, against which the upper spring turn abuts, and the operating staking surface portion of radius 128 is less than the free height of spring 22, as illustrated in FIG. 4. Accordingly, when the staking tool is moved down to the position illustrated in FIG. 5, spring 22 is slightly compressed. As an example, with a spring approximately one inch long, it may be compressed one-eighth to one-fourth of an inch, or such other value as may be selected. The precompressing insures good contact between the lower surface of the lower turn and the upper surface of the base 24, and insures that the spring is centered and straight.

As the tool 36 is driven further down, nub 34 is rolled outwardly, desirably over at least some portion of the lower spring turn above the level of the midpoint of the wire constituting the lower turn, and the tool is then withdrawn. The resultant assembly is illustrated in FIG. 3 of the drawings, with an illustrative degree of turning over of the lip of nub 34.

Since the springs in the noted application are subject to quite rigorous tolerances and requirements, it is preferred that the staked nub 34 not improperly interfere with the operation of the spring. Accordingly, it is preferred that the lower turn (or leading turn) of spring 22 be of smaller diameter than the diameter of the remaining turns of the spring, as illustrated in FIG. 3. Desirably, that diameter is sufficiently smaller so that no portion of the overlying part of nub 34, after the staking deformation, will significantly impede the motion of the second turn of the spring in a direction toward the plate 24. Thus, it is preferred that the inner diameter of the lower turn of the spring be less than the outer diameter of the top of the nub 34, but it is also preferred that the outer diameter of the top of the nub 34, after staking deformation, be less than the inner diameter of the next succeeding turn of the spring. Springs of that character can be readily formed with a standard double diameter cam type coiler, setting that machine to shrink the lead end of the generated spring only. A coiler of that type is contemplated for the coiler 100 in FIG. 6A of the drawings. The spring characteristics will of course be dictated by the automatic transmission requirements, and satisfactory units can be made using, purely as examples, 0.055 inch, 0.053 inch, 0.050 inch, and 0.047 inch diameter chrome silicon steel, springs of that material having been satisfactorily used in the assembly of FIG. 2 and utilizing the stress-relieving techniques discussed hereinafter.

As dimensional examples, in one arrangement, the nub 34 in FIG. 4 was formed (of 0.040 inch stock) with an inner diameter of about 0.310 inches, an outer diameter of about 0.390 inches, and a height above the upper surface of portion 24 of about 0.080 inches, the spring was made of 0.050 inch wire, the inner diameter of the lower turn was about the same as the outer diameter of nub 34, and the outer diameter of the lower turn was shrunk in from the outer diameter of the remaining turns by about 0.020 inches.

It will be appreciated that the particular staking operation above described is not essential to the practice of all of the principles of the present invention. Alternative securing means which are contemplated including the formation of a nub similar to that illustrated in FIG. 4 of the drawing in which the outer diameter of the cylindrical or slightly tapered nub or spaced tabs lying generally in a cylindrical or conical surface is slightly greater than the internal diameter of the spring 22, at least in the region of the base 24, so that a spring may merely be wedged thereon without staking or other deformation of the nub 34. In that case, the turns of the spring can be uniform in internal diameter. The nub or tabs can be formed to an upper outer diameter which is less than the internal diameter of the springs, followed by a next downward or intermediate section having a greater diameter than the internal diameter of the spring, followed by a lower section having an outer diameter smaller than that of the intermediate diameter section, to permit the lower turn of the spring to be snapped into place. Alternatively, rather than nubs, it is contemplated that downwardly projecting sockets be formed in the surface 20 in the base 24 of the seat, with the internal diameter of those sockets being essentially the same or slightly smaller than the outside diameter of the spring, so that the spring can be forced into the socket and adequately retained pending subsequent operations. It is also contemplated that the nub 34, rather than being a continuous cylinder, may consist of a plurality of individual tabs which are distortable in a staking sense by the tool of FIG. 4. Alternatively, those tabs can be formed to a larger diameter and be staked over the lower turn of the spring from the outside in, in which case the lower turn of the spring should advantageously be made larger than the other turns to avoid interference with the operation of the spring. Other securing means which will still permit the practice of principles of the invention will be apparent to those skilled in the art.

The assembly apparatus of FIGS. 6A, 6B and 7 is in cooperative co-relationship with a spring coiler 100 (FIG. 6A) of any suitable commercially available type capable of generating a compression coil spring from spring wire. The produced spring, a representative one of which is illustrated at 102, is generated, in one conventional form of coiling machine, in horizontal translation and the collar terminates the operation upon that spring by severing the generated spring from the supply wire to define an individual spring.

A tube or chute 104 has an entrance port proximate the point of generation of the spring 102 and an air jet 106, which may be continuously operative, is positioned to blast the generated and severed spring 102 into the entrance port of the chute 104 with sufficient force to compel the spring 102 to travel through any generally horizontal section of that tube 104 and to travel the length thereof. The function of the tube 104 is to guide the spring in its travel from the source, such as the coiler, to the assembly area and to insure that the spring does not reverse end to end. The source could, of course, be manual, or a detangler or separator, in which case the springs could be prestress-relieved if desired.

Tube 104 extends to the assembly apparatus and, in the illustrated preferred embodiment of the invention, has a generally curved portion which gradually converts into a vertical feed portion 105. The curved portion of tube 104 is apertured, as at 106, an alignment with the longitudinal axis of the vertical portion 105 of tube 104 to permit the free passage therethrough of a vertical reciprocating rod 108, which reciprocates on an axis generally coincident with that vertical portion of the tube 104. A distended shield 110 may be formed proximate aperture 106 to insure that rapidly traveling springs will not be improperly discharged or guided during their passage down the tube. It will be noted that since the spring cannot reverse, after being fed from the coiler in the preferred arrangement, only the bottom or lead turn needs to be closed or reduced in diameter, if those features are used.

At the time of the travel of the spring down the tube 104, following its ejection from the coiling machine 100, rod 108 is located in an upper position so that tip 112 does not impede free movement of the spring down the tube 104.

The lower end of tube 104, which is seated within a guide bushing 114 (FIG. 6B), mates with a conical section or centering funnel 116 which directs the moving spring into a guide section 118 in the guide bushing 114. The inner diameter of section 118 is small enough to insure approximate centering of the received spring 102 with respect to the longitudinal axis of rod 108. The spring 102 continues to travel into section 118 until it engages a spring plunger or detent 120 mounted in the guide bushing 114, defining a spring holding station. It is there stopped and retained, pending further operation of the machine.

A straight tube 104 can be employed by tilting the coiler and/or the assembly apparatus, as by tilting the former 45° in one direction and the assembly 45° in the opposite direction.

Rod 108 (FIG. 6A) is secured by means of a plate 122 to the piston rod 124 of a ram 126 which may be hydraulically actuated, pneumatically actuated, or, generically, fluid pressure actuated. In the preferred embodiment of the invention, the ram is pneumatically actuated and is of a commercially available type to produce a sudden release of back pressure on the achievement of a preselected forward pressure, so as to produce impact movement of the rod 108. Upon that movement, which, as will be seen, occurs after a spring has reached the position defined by detent 120 (FIG. 6B), rod 108 is driven downwardly generally along the longitudinal axis of section 118 of guide bushing 114. The internal diameter of section 118 is sufficiently small to insure that centering tip 112 will enter the interior of the coil spring. As rod 108 continues to move downwardly, with spring 102 still being retained by detent 120, the spring is further centered on the axis of rod 108 by the staking or spinning radius 128, to permit the cylindrical portion 130 of the rod 108 to enter the interior of the coil spring. This portion is also desirably smaller than the internal diameter of the coil spring.

The next upward section of rod 108 comprises the tapered portion 132, the lower diameter of which is smaller than the internal diameter of the spring and the upper diameter of which is desirably larger than the internal diameter of the spring (and of each spring, including tolerances) so that the upper turn of the spring tends to be jammed on to the shoulder or tapered portion 132 (at the detent 120) to insure that the spring is accurately positioned before it is driven through the detent 120. The perfection, is of course, not requisite.

Upon the engagement of portion 132 of rod 108 with the upper surface of the spring 102, it is driven past the detent 120 (which resiliently retracts to accommodate the passage), and downwardly through the bushing toward the fixture 134 mounted on an index table 135.

For illustrative use in association with a spring seat carrying 17 equally annularly spaced compression spring, the fixture 134 (FIG. 7) has a corresponding number of apertures correspondingly spaced, each such aperture desirably being defined by a hardened bushing 136 (FIG. 6B), which may be replaced when worn, the upper surface 138 of each of which is contoured to approximately conform to the indentation on the underside of the seat 20 adjacent each boss or nub 34 thereon. The bushings 136 are seated against the base plate 140, so as to be solid.

To orient and position the seat 20 on the fixture 134, a plurality of (such as three) equally annularly spaced locating and ejecting pins 142 are slidably disposed within individual ones of the bushings 136. These pins project above the seating surface 144 of the fixture 134 and are spring biased to an upward limit position as by means of individual springs 146. Pins 142 engage corresponding annularly spaced apertures in the seat 20 so as to accurately position the central axis of the seat with the central axis of the fixture and to align the individual apertures in the seat with the individual bushings 136.

When, as illustrated in FIG. 6B, the seat 20 is positioned upon the fixture 134 with sufficient accuracy to permit the self-centering locating pins 142 to engage the appropriate apertures in the seat, the operator actuates, momentarily, a latch arm 148 (FIG. 7) which pivots a crank 150 about a bolt 152. Crank 150 actuates limit switch LS6, for a purpose to be noted, and also moves a link 154 to pivot a dog 156, about a pivot point 158, away from a stop 160 and against the action of a return spring 162. Pivot point 158 is fixed with respect to the frame of the assembly apparatus.

Dog 156 cooperates with the actuating arm 164 of a pilot valve 166 which is physically mounted on, and rotates with, index table 135. Actuation of dog 156 actuates pilot valve 166 to admit pressurized air (FIG. 9) from a source 168 to a pneumatic cylinder 170 to operate a valve 172, which admits air from source 168 to one side of each of two cylinders 174 and 176, which are the cylinders of a clamping system such as that commercially sold under the name Stilson Rotoclamp.

Cylinders 174 and 176, on actuation, first rotate their respective piston rods 178 and 180 (FIG. 6B) 90° to rotate the respective clamps 182 and 184, mounted thereon, from a position in nonoverlying relation to the workpiece 20, as illustrated in FIG. 6B, to a position in overlying relation to diametrically opposed edge portions of the lip 28 (FIG. 2) of the workpiece, as illustrated in FIG. 7. Clamp cylinders than retract their respective piston rods to drive the workpiece 20, and the locating pins 142 downwardly (FIG. 7) to firmly seat the part 20 on the fixture and clamp it thereto.

The assembly apparatus is now in condition to perform the assembly operations, in cooperation with the coiler 100 (FIG. 6A).

While coiler 100 may be any suitable type, it is assumed that it is a standard, double diameter, cam type machine having the capability of shrinking the lead turn, as above described, and having a collar clutch 166 (FIG. 9). It is modified to provide for cooperative association with the assembly apparatus. Thus, two cams 188 and 190 are mounted on the existing camshaft 192 of the collar, that shaft rotating once per spring generating cycle. Cam 188 is provided with a narrow lobe 194, capable of tripping a limit switch LS1, and cam 190 is provided with a broader lobe 196, capable of tripping a limit switch LS2. Limit switch LS1 is tripped after the spring has been generated and cut off and hence driven down the tube 104 to the detent 120 (FIG. 6B). Limit switch LS2, which is normally tripped before limit switch LS1, also senses the completion of the spring generating and cutoff operation and controls the coiler clutch 186, as will be seen.

Referring now to the electrical schematic diagram of FIG. 8 and the pneumatic schematic diagram of FIG. 9 taken in conjunction with the mechanical drawings, after the initial setup, in which it is insured that the coiler 100 has generated a spring 102 which is at the location of detent 120 (FIG. 6B), a manually actuable switch T1 is toggled to its closed position and manually actuable switches T2 and T3 are toggled to their open positions. These are set-up switches, switch T1 controlling the indexing and switches T2 and T3 (paralleled) controlling the coiler clutch. Switches T1 and T2 are desirably located conveniently to the assembly machine operator and switch T3 is desirably convenient to the coiler to permit selective disabling of its operation.

The closure of switch T1 (FIG. 8) enables the energization of solenoid S3, to start the operation of the staking cylinder, but does not cause that to occur at this time because limit switch LS1 is released and is open. The opening of switches T2 and T3 disables those switches to energize solenoid S5 so as to enable (but not cause) the coiler to commence its operation. However, at this time, the index table is at its "home" or starting position in which bushing 154 (FIG. 7) is aligned with the axis of rod 108 (FIG. 6A). As a result cam or lobe 198 (FIG. 7) on index table 135 is in engagement with the actuating arm of limit switch LS7, so that limit switch LS7 is actuated to close its normally open contact LS7b (FIG. 8). In addition, since piston rod 124 (FIG. 6A) of cylinder 126 is retracted, limit switch LS3 is actuated to close its normally open contacts (FIG. 8) since the plate 122 (FIG. 6A) of the staking cylinder 126 is in its uppermost position. Additionally limit switch LS2 (FIG. 6A) is closed since coiler 100 has already completed a cycle in which it has generated a spring 102 and ejected it into tube 104. Accordingly, a circuit (FIG. 8) is completed to energize solenoid S5 through those three sets of contacts. Solenoid S5, when actuated, actuates the coiler clutch valve 200 (FIG. 9) to actuate the coiler clutch 186 to hold the coiler 100 (FIG. 6A) in an idle condition.

Since the index table 135 is in its "home" position, limit switch LS8 (FIG. 7) is not actuated by lobe 198, so that its contacts (FIG. 8) are closed. Accordingly, when limit switch LS6 (FIG. 7) is momentarily operated as above described, it completes a circuit (FIG. 8) to energize relay CR1. Relay CR1, in operating, closes its normally open contacts CR1b to complete a locking circuit for itself through limit switch LS8 and bypassing limit switch LS6, so that relay CR1 remains operated even after the operator releases the latch arm 196, shortly after actuating it. Relay CR1 also closes its contacts CR1a to create an enabling circuit for solenoid S3.

The apparatus remains in this condition until the operator momentarily actuates the start button PB1 (FIG. 8) which is physically located conveniently to the assembly apparatus operator. When that occurs, an energizing circuit is completed for solenoid S3 (FIG. 8) to toggle the staking cylinder valve 204 (FIG. 9) to a position to admit air to the staking cylinder 126. Even though solenoid S3 be then deenergized, valve 204 will remain in that position until solenoid S4 is operated.

The actuation of the staking cylinder 128 initiates the impact movement of the rod 108 in a downward direction. As soon as that rod, and its attached plate 122, start downwardly, limit switch LS3 (FIG. 6A) is released to open its contacts (FIG. 8) to interrupt the previously described energizing circuit for solenoid S5 and to permit that solenoid to release. The release of solenoid S5 permits the coiler clutch valve 200 (FIG. 9) to be spring restored to a position in which the coiler clutch 186 is engaged so as to initiate the action of the coiler 100 in its generation of the next succeeding spring 102. In the preferred arrangement, the operation of the assembly apparatus, during the assembly of each spring to the seat, is more rapid than the time required for the coiler 100 to generate one spring, so that the operation of the coiler is initiated early in the assembly cycle so as to minimize the delays between staking operations.

As soon as the coiler 100 starts operating, limit switch LS2 is released, without affect at this time.

When rod 108 (FIG. 6A) of staking cylinder 126 reaches its downward, fully staking position, plate 123 actuates limit switch LS5 which immediately completes an energizing circuit for solenoid S4 (FIG. 8). Solenoid S4, in operating, switches valve 204 (FIG. 9) to a position to pneumatically retract the staking cylinder 126. Valve 204 remains in that condition, even though the actuation of solenoid S4 is but momentary, until solenoid S3 is subsequently operated.

As rod 108 (FIG. 6A) moves upwardly during its retracting stroke, plate 122 actuates limit switch LS4. It will be noted that while plate 122 strikes limit switch LS4 during the downward movement thereof, the actuating arm of limit switch LS4 is freely pivotable in a downward sense so that the electrical condition of limit switch LS4 is not changed under that condition. However, on the upward stroke, limit switch LS4 is actuated, and an energizing circuit (FIG. 8) is completed to energize solenoid S1. Solenoid S1 switches the index table valve 206 (FIG. 9) to a position in which air is admitted from source 168 to the air motor 208 on the index table (which is a commercially available until) to start indexing movement of that table. Index table 135 (FIG. 7) is provided with a cam 210 which rotates one full revolution for each indexing step, and during the course of each revolution it actuates limit switch LS9. Limit switch LS9, when operated, actuates solenoid S2 (FIG. 8) to toggle valve 206 (FIG. 9) back to a position in which air is no longer admitted to air motor 208, and the index table coasts to its correct second-index position.

Since table 135 has now indexed one step from its home position, limit switch LS7 (FIG. 7) is released. That limit switch remains released throughout the remainder of the work cycle, that is, until the completion of the workpiece with all of the springs installed thereon. Limit switch LS7, in releasing, closes its contacts LS7b (FIG. 8) to place solenoid S3 under the control of limit switch LS1, for a purpose to be noted. Limit switch LS7, upon releasing, also opens its contacts LS7a so that the assembling apparatus will not be capable of actuating solenoid S5, to declutch the coiler, until the complete work cycle is over.

When rod 108 (FIG. 6A) and plate 122 restore to the fully retracted position, limit switch LS3 is again closed, which is without affect at this time.

At its completion of the cycle of operation of the coiler 100, an additional spring 102 is ejected into tube 104, to travel down to the position of detent 120. At this time, the coiler actuates limit switches LS1 and LS2, the latter having no affect at this time. The closure of limit switch LS1 (FIG. 8) actuates solenoid S3, since contact LS7b is now closed, to extend the staking cylinder 126, as above described, and the operation repeats on this basis. It will be noted that the cyclic reoperation of the staking cylinder 126 could be controlled by the sensing of the passage of a spring in the tube 104 or its arrival at the holding station.

At any selected time (selected by the mechanical position of switch LS8) after index table 135 (FIG. 7) is off its home position, limit switch LS8 is actuated. This opens the locking circuit (FIG. 8) for relay CR1 to release that relay and to thereby disable start button PB1 to control solenoid S3 as long as the work cycle is continuing.

After the requisite number of operations (representatively 17), the index table 135 is again restored to its home position to actuate limit switch LS7 (FIG. 7). The actuation of limit switch LS7 opens contact LS7b (FIG. 8) to disable solenoid S3 so that the staking cylinder 126 cannot be operated. In addition, the closure of limit switch contact LS7a complete an energizing circuit for solenoid S5, since limit switches LS2 and LS3 are now closed, which again actuates the coiler clutch valve 200 (FIG. 9) to actuate the coiler clutch 202 in a sense to idle the coiler.

At the same time that the index table 135 (FIG. 7) restores to its home position (indicating that the operations on the workpiece are completed), arm 164 of pilot valve 166 strikes dog 156 which shifts clamping valve 172 (FIG. 9) to release the clamping cylinders 174 and 176. This releases the workpiece and permits the locating and ejecting pins 142 to raise the workpiece sufficiently for the operator to readily remove it and place a new seat in position for the next cycle of operations.

It will be observed that the control equipment is illustrated for a preferred system in which the assembling apparatus is capable of performing each stroke of its operation more rapidly than the coiler 100 can perform each cycle of its operation. If for any reason, the assembler is designed to be slower than the coiler, then the assembler rather than the coiler should control the institution of each succeeding cycle of operation as, for example, by shorting out (or bridging) contacts LS7a and adding a second set of normally open contacts, on limit switch LS3, which are inserted in series with limit switch LS1 (FIG. 8). Other suitable alternatives will be readily apparent to those skilled in the art.

If the springs are to be stress-relieved after assembly to the seat, that can be accomplished by heating the entire assembly in an oven.

However, the preferred method and apparatus for doing so are diagrammatically illustrated in FIG. 10 of the drawings.

The assembly of FIG. 2, comprising the seat 20 and the plurality of springs 22, is inserted in a clamping fixture comprising a fixed, rigid base electrode 220, an upper electrode 222, and an electrical insulating plate 224. The upper electrode 222 can be pressed toward the fixed electrode 220 by any suitable force exerting mechanism such as a fluid-actuated ram or cylinder 226 controlled by a conventional control mechanism 228. A welder can be used.

The workpiece is inserted between the electrodes 220 and 222 which are parallel and large enough to engage the full surface of the lower face of seat 20 and all of the springs 22. Cylinder 226 is actuated to press electrode 222 towards electrode 220 until a preselected (for any one type of workpiece assembly) distance exists therebetween, as is represented to be accomplished in the diagrammatic representation of FIG. 10 by arm 230, on the rod of cylinder 226, engaging a stop 232.

Current from current source 234 is then applied through the seat 20 and thence (in either or both polarities) through the springs 22 in parallel. Both the seat and the springs are resistance heated by that current, but the temperature rise of the seat 20 is significantly less than that of the springs due, largely, to the fact that the resistance of the seat to current flow in the noted path is smaller than the resistance of the electrically paralleled springs. The springs are controllably heated to a higher temperature than the plate, so that the springs can be raised to an appropriate stress-relieving temperature (such as 750° F.) without elevating the temperature of the sheet-metal seat to the point at which scaling or bluing would develop.

It has been found that temperature-sensitive crayons, or points can be applied to the springs to determine the current-time characteristics to produce the requisite spring temperatures for the requisite stress-relieving time.

Direct current or alternating current may be employed. In an operative arrangement, a resistance welder capable of producing heat-cool cycles of operation was employed, with the duration of the intervals being controllable and the percent heat (or current amplitude) during the heat cycles also being controllable.

In one arrangement, it was found that proper stress-relieving temperatures were achieved and held for a suitable time by applying about 900 amperes (to rapidly bring the springs to temperature) for 118 cycles (measured at a 60 Hz rate), followed by 180 cycles of cooling, 32 cycles at 450 amperes, 180 cycles of cooling, 32 cycles at 450 amperes, and so on for 20 seconds total. This, of course, will vary with the characteristics of the parts.

If the particular spring material does not change the spring height during the stress-relieving, the jaws 222 and 220 should be closed sufficiently to partially compress the springs 22 to insure good electrical contact. However, using spring stocks which do shift height at the appropriate stress-relieving temperatures (such as the material noted above) a further advantage accrues from this method of stress-relief. The springs are purposefully made too long (as by increasing the pitch at the coiler) for their correct final dimension, such as one-eighth of an inch too long, as an example. Much greater variations in length of the mass-produced springs become tolerable. The jaws 220 and 222 are then closed to the correct overall height of the final assembly, resulting, in the noted example, in a compression of the springs of about one-eighth of an inch. The springs, after the noted compressive stress-relieving operation are at the correct, preselected final height, and are uniformly so despite variations in their original manufactured heights.

It will be appreciated that it is not essential to the practice of any of the principles of the invention that any or all of the other principles be practiced. As examples, the springs can be made, stress-relieved, sorted, and either hand staked or machine staked. Also, the springs can be individually generated, fed in orientation through oven stress-relieving (as by feeding them through a tube in the oven) and then fed back to the manual or machine assembly, without tangling. Also, an assembly in which the springs are merely trapped between two parts can be manufactured with nonstress-relieved springs and the assembly stress-relieved by the taught electrical stress-relieving techniques. Other alternatives and combinations will be apparent from those examples.

It is alternatively contemplated that the association of the springs 22 with the seat 20 be accomplished by brazing. Thus, as is diagrammatically represented in FIG. 11, a thin annulus of brazing material 238 can be seated against the unperforated face 24 of the seat 20, between the lips 26 and 28. A fixture 240 is provided with a plurality of properly circumferentially spaced individual spring cavities 242 into each of which a spring 22 is loaded. The annular end of the fixture 240 fits within the seat 20, between lips 26 and 28, as illustrated. The assembly is clamped, desirably compressing the springs 22, by any suitable clamping means, as illustrated at 244. The clamped assembly is heated to a suitable stress-relieving temperature at which the brazing also occurs, as accomplished by proper selection of the brazing material. That may be accomplished in an oven. It is alternatively contemplated that while maintaining electrical contact between the fixture 240 and the lower (in the orientation of FIG. 11) end of each of the springs 22, the remainder of the fixture 240 be electrically insulated from all other metal parts, as by making the walls 242 of ceramic or coating with insulating material the inner side walls of the cavities 242, the upper ends thereof, and the outer surfaces at least adjacent lips 26 and 28. The assembly may then be clamped using the apparatus of FIG. 10 to do the stress relieving and the brazing with electrical resistance heating. The brazing material 238 should in that case be relatively thin so that sufficient heat will be developed, at least at tacking points engaging the end spring turn to braze the parts together sufficiently to retain them in relationship pending completion of the further assembly operations.

What is claimed is:

1. A machine for manufacturing a spring assembly having a base and a plurality of springs disposed on and extending in spaced parallelism from the base comprising a spring coiler, an assembly location, securing means at said location for securing the springs to the base, and feeding means extending from said coiler to the assembly location for feeding the successive springs from the coiler directly to said assembly location, said feeding means comprising tube mans having a first portion disposed proximate said spring coiler, a second portion in spaced proximity to said assembly location and having a longitudinal axis perpendicular to the surface of the base, and an entryway between said first and said second portions, and in which said securing means comprises a tool selectively movable along its own longitudinal axis from a position exterior to said tube means through said entryway and into said second portion of said tube means, with said longitudinal axis of said tool being essentially coaxial with the longitudinal axis of said second portion.

2. The combination of claim 1 further including control means for actuating said spring coiler only when said tool is withdrawn from said entryway and for actuating said tool for movement along its longitudinal axis after said feed means has transferred a spring past said entryway towards said second portion.

3. The combination of claim 1 in which said tool comprises a portion insertable within each successive coil spring and a shoulder portion for selectively compressing said spring into forceable engagement with the surface of the base at said assembly location.

4. The combination of claim 1 in which the spring has an end turn, in which the base has a protuberance at the location of each of the springs and in which said tool further includes means for distorting said protuberance into locking engagement with the end turn of the spring.

5. A machine for manufacturing a spring assembly having a base and a spring extending substantially perpendicularly to the base and having an end-turn portion secured thereto comprising spring coiler means for forming a complete separate coil spring having an end turn portion, a member having an aperture therein accepting the completed spring, means on said machine for transferring the complete spring from said spring coiler means into the aperture in said member, a tool, means for moving the spring and said tool relative to one another for moving the spring from the aperture in said member and disposing the spring on and in surrounding relationship to a portion of said tool, means for moving the base and said tool with the spring thereon relative to one another for moving the spring into engagement with the base, and means including said tool for securing the end turn portion of the spring to the base.

6. The combination of claim 5 in which the spring as formed by said coiler has a leading end turn portion and a trailing end turn portion.

7. The combination of claim 6 in which the end turn portion of the spring which is secured to the base is the leading end turn portion.

8. The combination of claim 5 in which said end turn portion is flat and closed.

9. The combination of claim 5 further including means for holding and positioning the base.

10. A machine for manufacturing a spring assembly having a base having an aperture therein surrounded by a projecting protuberance having a generally cylindrical wall portion and a spring extending substantially perpendicularly to the base and having an end-turn portion secured thereto comprising spring coiler means for forming a complete separate coil spring having an end turn portion, a member having an aperture therein accepting the completed spring, means on said machine for transferring the complete spring from said spring coiler means into the aperture in said member, a tool, means for moving the spring and said tool relative to one another for moving the spring from the aperture in said member and disposing the spring on and in surrounding relationship to a portion of said tool, means for moving the base and said tool with the spring thereon relative to one another for moving the spring into engagement with the base with the end turn portion thereof in surrounding relation to the wall portion of the protuberance, and means including said tool for deforming a portion of the wall portion of the protuberance into securing relationship with at least a portion of the end turn portion of the spring for securing the end turn portion of the spring to the base.

11. The combination of claim 10 further including means for holding and positioning the base and having a guide bushing therein aligned with the aperture in the base and accepting a portion of the tool.

12. The combination of claim 11 in which the base further has an indentation surrounding the aperture in the base on the opposite side thereof from the protuberance, and in which said guide bushing has a surface engaging and substantially conforming to the shape of the indentation in the base.

13. The combination of claim 10 in which said tool has a portion which engages a portion of the spring for compressing and straightening and centering the spring relative to the base.

14. A machine for manufacturing a spring assembly having a base and a spring extending substantially perpendicularly to the base and having an end-turn portion secured thereto comprising spring coiler means for forming a complete separate coil spring having an end turn portion, a member having an aperture therein accepting the completed spring, means on said machine for transferring the complete spring from said spring coiler means into the aperture in said member while maintaining the spring free of tangling lateral engagement with any other spring from the time of the coiling thereof by said spring coiler means to the positioning of the spring in the aperture in said member, a tool, means for moving the spring and said tool relative to one another for moving the spring from the aperture in said member and disposing the spring on and in surrounding relationship to a portion of said tool, means for moving the base and said tool with the spring thereon relative to one another for moving the spring into engagement with the base, and means including said tool for securing the end turn portion of the spring to the base.

15. A machine for manufacturing a spring assembly having a base and a spring extending substantially perpendicularly to the base and having an end-turn portion secured thereto comprising spring coiler means for forming a complete separate coil spring having an end turn portion, a member having an aperture therein accepting the completed spring, means on said machine for transferring the complete spring from said spring coiler means into the aperture in said member, means for selectively holding said spring in the aperture in said member, a tool, means for moving the spring and said tool relative to one another for moving the spring from the aperture in said member and disposing the spring on and in surrounding relationship to a portion of said tool and for releasing the spring from the aperture in said member, means for moving the base and said tool with the spring thereon relative to one another for moving the spring into engagement with the base, and means including said tool for securing the end turn portion of the spring to the base.

16. The combination of claim 15 in which said means for releasing said spring from the aperture in said member includes a portion of said tool.

17. The combination of claim 16 in which a portion of the tool is larger than the internal diameter of the spring and forcibly engages the spring.

18. A machine for manufacturing a spring assembly having a base and a spring extending substantially perpendicularly to the base and having an end-turn portion secured thereto comprising spring coiler means for forming a complete separate coil spring having an end turn portion, a member having an aperture therein accepting the completed spring, tubing means between the spring output of said spring coiler means and said member for transferring the complete spring from said spring coiler means into the aperture in said member, a tool, means for moving the spring and said tool relative to one another for moving the spring from the aperture in said member and disposing the spring on and in surrounding relationship to a portion of said tool, means for moving the base and said tool with the spring thereon relative to one another for moving the spring into engagement with the base, and means including said tool for securing the end turn portion of the spring to the base.

19. The combination of claim 18 further including means for moving the completed spring from the output of said spring coiler means.

20. The combination of claim 18 in which said last-mentioned means includes means for producing a jet of air.

21. A machine for manufacturing a spring assembly having a base and a spring extending substantially perpendicularly to the base and having an end-turn portion secured thereto comprising a member having an aperture therein accepting a completed spring, a tool, means for moving the spring and said tool relative to one another for moving the spring from the aperture in said member and disposing the spring on and in surrounding relationship to a portion of said tool, means for moving the base and said tool with the spring thereon relative to one another for moving the spring into engagement with the base, and means including said tool for securing the end turn portion of the spring to the base.

22. A machine for manufacturing a spring assembly having a base and a spring extending substantially perpendicularly to the base and having an end-turn portion secured thereto comprising a member having an aperture therein accepting a completed spring, means for selectively holding said spring in the aperture in said member, a tool, means for moving the spring and said tool relative to one another for moving the spring from the aperture in said member and disposing the spring on and in surrounding relationship to a portion of said tool and for releasing the spring from the aperture in said member, means for moving the base and said tool with the spring thereon relative to one another for moving the spring into engagement with the base, and means including said tool for securing the end turn portion of the spring to the base.

23. The combination of claim 22 in which said means for releasing said spring from the aperture in said member includes a portion of said tool.

24. The combination of claim 23 in which a portion of the tool is larger than the internal diameter of the spring and forcibly engages the spring.

25. A machine for manufacturing a spring assembly having a base having an aperture therein surrounded by a projecting protuberance having a generally cylindrical wall portion and a spring extending substantially perpendicularly to the base and having an end-turn portion secured thereto comprising a member having an aperture therein accepting a completed spring, a tool, means for moving the spring and said tool relative to one another for moving the spring from the aperture in said member and disposing the spring on and in surrounding relationship to a portion of said tool, means for moving the base and said tool with the spring thereon relative to one another for moving the spring into engagement with the base with the end turn portion thereof in surrounding relation to the wall portion of the protuberance, and means including said tool for deforming a portion of the wall portion of the protuberance into securing relationship with at least a portion of the end turn portion of the spring for securing the end turn portion of the spring to the base.

26. The combination of claim 25 further including means for holding and positioning the base and having a guide bushing therein aligned with the aperture in the base and accepting a portion of the tool.

27. The combination of claim 26 in which the base further has an indentation surrounding the aperture in the base on the opposite side thereof from the protuberance, and in which said guide bushing has a surface engaging and substantially conforming to the shape of the indentation in the base.

28. The combination of claim 25 in which said tool has a portion which engages a portion of the spring for compressing and straightening and centering the spring relative to the base.

29. A machine for manufacturing a spring assembly having a base and a plurality of springs secured on and extending in spaced parallelism from the base comprising spring coiler means for automatically forming complete separate coil springs, an assembling apparatus for securing the coil springs and automatically securing the springs on the base, and control means controlled by said assembling apparatus for controlling the operation of said spring coiler means.

30. The combination of claim 29 in which said control means controls the starting and stopping of the automatic operation of the spring coiler means for controlling the rate of supply of the springs.

31. A machine for manufacturing a spring assembly having a base and a plurality of springs secured on and extending in spaced parallelism from the base comprising spring coiler means for automatically forming complete separate coil springs, an assembling apparatus for securing the coil springs and automatically securing the springs on the base, and control means controlled by said spring coiler for controlling the operation of said assembling apparatus.

32. The combination of claim 31 in which said control means controls the starting and stopping of the automatic operation of said assembling apparatus.

* * * * *